US012492353B2

(12) United States Patent
Zhmud et al.

(10) Patent No.: US 12,492,353 B2
(45) Date of Patent: Dec. 9, 2025

(54) INDUCED FORMATION OF SOLID LUBRICANT

(71) Applicant: Tribonex AB, Uppsala (SE)

(72) Inventors: Boris Zhmud, Uppsala (SE); Linus Everlid, Uppsala (SE); Danilo Vivedes, Uppsala (SE); Martin Bengtsson, Vange (SE)

(73) Assignee: Tribonex AB, Uppsala (SE)

( * ) Notice: Subject to any disclaimer, the term of this patent is extended or adjusted under 35 U.S.C. 154(b) by 41 days.

(21) Appl. No.: 18/695,961

(22) PCT Filed: Sep. 28, 2022

(86) PCT No.: PCT/SE2022/050859
§ 371 (c)(1),
(2) Date: Mar. 27, 2024

(87) PCT Pub. No.: WO2023/055274
PCT Pub. Date: Apr. 6, 2023

(65) Prior Publication Data

US 2024/0384200 A1 Nov. 21, 2024

(30) Foreign Application Priority Data

Sep. 29, 2021 (SE) .................................... 2151191-0

(51) Int. Cl.
*C10M 177/00* (2006.01)
*B24B 39/00* (2006.01)
(Continued)

(52) U.S. Cl.
CPC ......... *C10M 177/00* (2013.01); *B24B 39/006* (2013.01); *C10M 103/00* (2013.01);
(Continued)

(58) Field of Classification Search
CPC .............. C10M 103/00; C10M 177/00; C10M 2207/10; C10M 2070/00; B24B 39/006; F16N 15/00
See application file for complete search history.

(56) References Cited

U.S. PATENT DOCUMENTS 3,574,658 A 4/1971 Fulk et al.
9,032,597 B2 * 5/2015 Zhmud ................ C10M 169/04 29/90.01

(Continued)

FOREIGN PATENT DOCUMENTS

CN 112575324 3/2021
WO WO-89/07524 A1 8/1989

(Continued)

OTHER PUBLICATIONS

Y. Yoshimi, et al., Surface Treatment Technology for Sliding Parts of Compressors, International Compressor Engineering Conference at Purdue, Jul. 17-20, 2006, C063; 8 pages.

(Continued)

*Primary Examiner* — James C Goloboy
(74) *Attorney, Agent, or Firm* — Harness, Dickey & Pierce, P.L.C.; Anthony G. Fussner

(57) ABSTRACT

A method and a device for induced formation of solid lubricant comprises providing (S10) of an article (10) to be processed. The article is exposed (S20) to a process fluid (34) comprising a solvent, impact media (20) and additives of solid-lubricant precursor substances. The solvent is a low-volatile high-flash solvent. The impact media are non-abrasive hard particles. The additives of solid-lubricant precursor substances are surface-reactive compounds serving as carriers of at least one of S, P, B and of at least one refractory metal. A velocity difference between surfaces (12) of the article and the impact media is created (S30). This causes impacts between the impact media and the article.
(Continued)

Solid lubricant substances are formed (S40) on the surfaces by chemical reactions. The chemical reactions comprise the solid-lubricant precursor substances and are induced by the energy of the impacts. The chemical reactions take place at the surfaces of the article.

20 Claims, 7 Drawing Sheets

(51) Int. Cl.
*C10M 103/00* (2006.01)
*C10N 70/00* (2006.01)
*F16N 15/00* (2006.01)

(52) U.S. Cl.
CPC ......... *F16N 15/00* (2013.01); *C10M 2207/10* (2013.01); *C10N 2070/00* (2013.01)

(56) References Cited

U.S. PATENT DOCUMENTS

| | | | |
|---|---|---|---|
| 9,162,424 B2 | 10/2015 | Cox et al. | |
| 10,266,783 B2 | 4/2019 | Lee et al. | |
| 2002/0183209 A1 | 12/2002 | Jee et al. | |
| 2008/0142050 A1* | 6/2008 | Hashish | B24C 3/325 134/22.12 |
| 2010/0264649 A1 | 10/2010 | Goto et al. | |
| 2011/0165331 A1 | 7/2011 | Barth et al. | |
| 2015/0013412 A1 | 1/2015 | Haverty et al. | |

FOREIGN PATENT DOCUMENTS

| | | |
|---|---|---|
| WO | WO-93/03919 A1 | 3/1993 |
| WO | WO-2012/008890 A1 | 1/2012 |
| WO | WO-2017/078592 A1 | 5/2017 |

OTHER PUBLICATIONS

Y. Ishida et al., Frictional Properties of Textured Surfaces by Fine Particle Peening in Lubricated Condition. The Proceedings of the Machine Design and Tribology Division meeting in JSME. 2008. 8. 165-166. 2 pages.

Ali Erdemir, Low-Friction Materials and Coatings, in Multifunctional Materials for Tribological Applications (Robert J. K. Wood), Jenny Stanford Publishing, New York, 2015, Chapter 8; 32 pages.

B. Zhmud, In-manufacture Running-in of Engine Components by Using the Triboconditioning® Process, M. Abdel Wahab (Ed.): FFW 2018, LNME, pp. 671-681, 2019; 11 pages.

Swedish Search Report for SE2151191 that is the parent application to the instant application; dated May 19, 2022; 2 pages.

International Search Report and Written Opinion for PCT/SE2022/050859 that is a parent application to the instant application; dated Dec. 10, 2022; 9 pages.

Supplementary European Search Report for EP22877016 that claims priority to the same parent application as the instant application; Jul. 21, 2025, 3 pages.

* cited by examiner

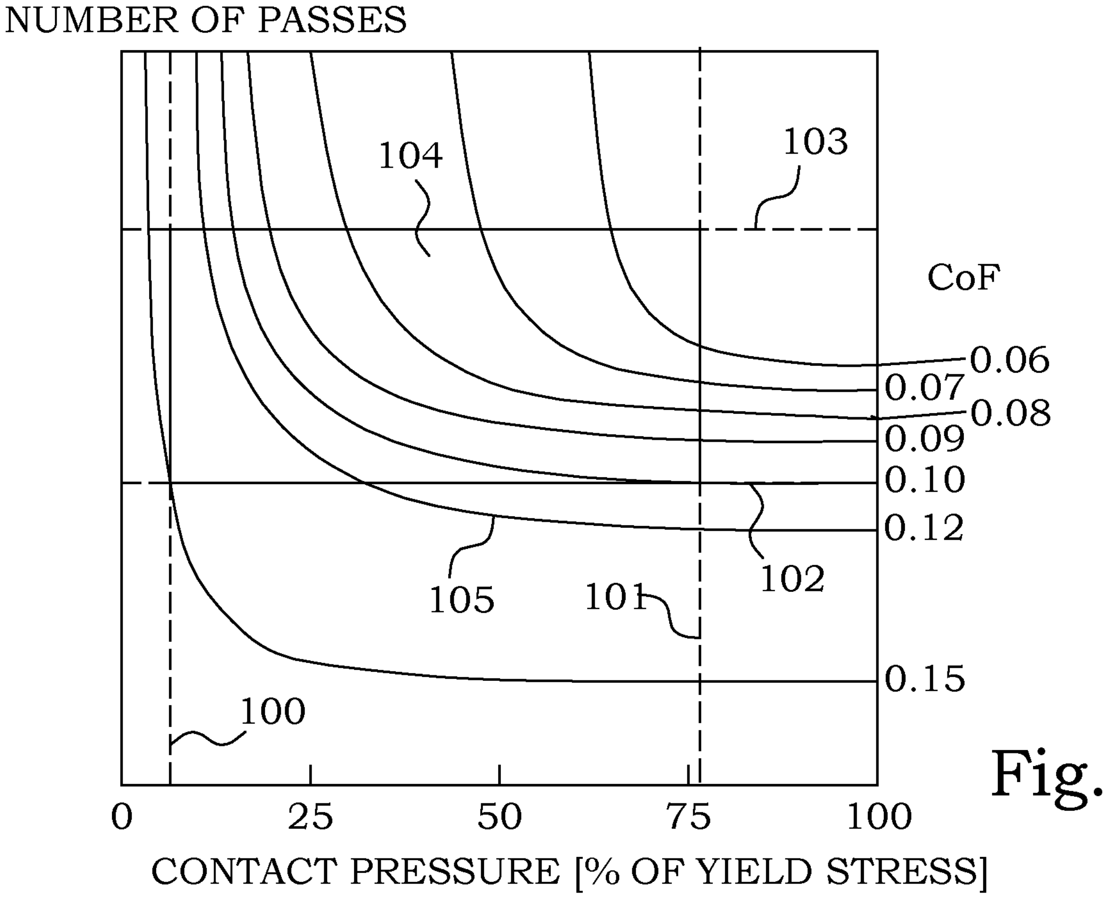
Fig. 1
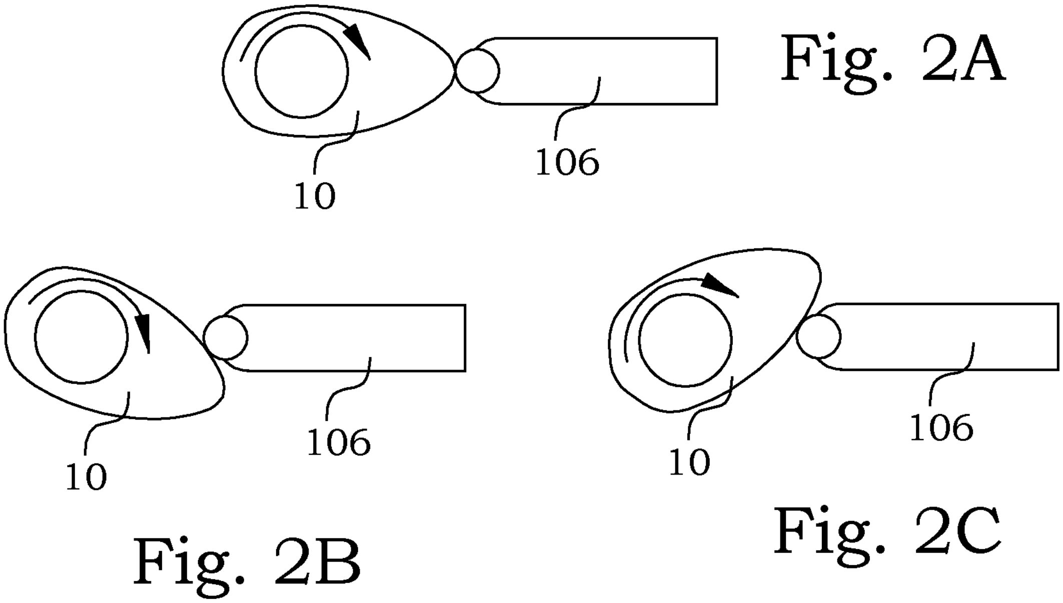
Fig. 2A
Fig. 2B
Fig. 2C

| | | |
|---|---|---|
| **R[LC ISO 16610-21 0,8 mm]** | | |
| Ra | 0,203 | µm |
| Rz | 1,532 | µm |
| Rsk | -0,454 | |
| **Rk[LC ISO 13565 0,8 mm]** | | |
| Rpk | 0,159 | µm |
| Rk | 0,635 | µm |
| Rvk | 0,365 | µm |

| | | |
|---|---|---|
| **R[LC ISO 16610-21 0,8 mm]** | | |
| Ra | 0,141 | µm |
| Rz | 1,270 | µm |
| Rsk | -1,282 | |
| **Rk[LC ISO 13565 0,8 mm]** | | |
| Rpk | 0,086 | µm |
| Rk | 0,417 | µm |
| Rvk | 0,350 | µm |

INDUCED FORMATION OF SOLID LUBRICANT

This patent application is a U.S. national stage filing under 35 U.S.C. § 371 of PCT International Application No. PCT/SE2022/050859 filed Sep. 28, 2022 (published as WO 2023/055274 on Apr. 6, 2023), which claims priority to and the benefit of Swedish Application No. 2151191-0 filed Sep. 29, 2021. The entire contents of these applications are incorporated herein by reference.

TECHNICAL FIELD

The present technology relates in general to lubrication of articles, and in particular to methods and devices for induced formation of solid lubricants at article surfaces.

BACKGROUND

In every device comprising moving parts, wear and friction are always an issue. In some cases, mechanical contact may be avoided, thereby reducing friction and wear. However, in most cases, the moving parts are moved in mechanical contact with other parts of the device. In such cases, means for reducing the friction and wear by provision of lubricant substances to the interaction area are common. The most common lubricant substances are even today liquid types, such as different kinds of lubricating oils. An alternative is to provide solid lubricants onto the surfaces in mechanical contact. The lubricants keep the surfaces apart and are in themselves easily shearable, which reduces the force needed to achieve a relative motion.

The use of certain solid film lubricants has been known for quite some time. Graphite, either as such, or embedded into a binder are common examples. Vaporized reactive substances containing phosphorus, sulfur, selenium or halogen atoms have also been used for long. Different approaches using e.g. molybdenum disulfide held in a matrix of a resin are also known, and may e.g. be deposited by mechanical interaction between a surface and a tool in the presence of the resin. One could also mention a group of prior art techniques describing low-friction films produced by PVD, CVD and/or plasma-sputtering.

Low friction surfaces can also be produced using kinetic methods, such as fine particle peening, fine particle shot peening, and ultra-fine shot peening, either by adding a solid lubricant to the shot medium, or by using the said solid lubricant powder as the shot medium. Molybdenum disulfide and tungsten disulfide are the solid lubricants most commonly used for that purpose, see e.g. Y. Yoshimi, et al., Surface Treatment Technology for Sliding Parts of Compressors, International Compressor Engineering Conference at Purdue, Jul. 17-20, 2006, C063 or Y. Ishida et al., Frictional Properties of Textured Surfaces by Fine Particle Peening in Lubricated Condition. The Proceedings of the Machine Design and Tribology Division meeting in JSME. 2008. 8. 165-166.

There are also other numerous coating methods that are used to reduce friction wear, see e.g. Ali Eldemir, Low-Friction Materials and Coatings, in Multifunctional Materials for Tribological Applications (Robert J. K. Wood), Jenny Stanford Publishing, New York, 2015, Chapter 8. For example, laser cladding technique can also be used to produce wear-resistant composite coating layers that incorporate solid lubricants, c.f. the published Chinese patent application CN 112575324 A. A variety of thermal spray methods such as HVOF spray deposition as described in the U.S. Pat. No. 9,162,424 B2 is another option. However, such approaches fail to meet tight tolerances without post-machining of coated items. The published US patent application US 2011/0165331 describes a method for manufacturing a polymer-bonded low friction coating comprising a resin binder and ceramic particulate filler. Another invention, disclosed in the U.S. Pat. No. 10,266,783 B2, describes the low friction surfaces featuring protruding nanotubes. Unfortunately, practical applicability of the method disclosed therein is seriously limited due to the thermal expansion coefficient mismatch between the glass binder and the metal base, that will lead to a rapid coating loss under combined loading and thermal cycling, and the detrimental heath safety profile of nanotubes.

Common for most solid lubricant systems is that the lubricant is deposited onto the surface either as a pure lubricant substance or as a lubricant in a bearer substance. The deposition can be followed by different kinds of post treatments, typically thermal treatments or mechanical treatments. The lubricants will thus be provided as a layer on top of the surface to be lubricated. It is difficult to obtain a good adherence to the surface at the same time as a low friction is to be shown to a neighboring surface.

Mechanochemical surface finishing is another attractive alternative for manufacturing low-friction surfaces. An example of industrial processes relying on mechanochemistry is Triboconditioning®, see e.g. the published international patent application WO 2012/008890. The process combines elements of mechanical burnishing of the component surface with tribochemical deposition of a low-friction tribofilm. By doing so, the running-in behavior of treated components is improved and useful service life extended, see e.g. B. Zhmud, In-manufacture Running-in of Engine Components by Using the Triboconditioning® Process, M. Abdel Wahab (Ed.): FFW 2018, LNME, pp. 671-681, 2019.

The Triboconditioning® treatment relies upon in situ chemical generation of the solid lubricant in the tribological contact during the process. This guarantees that an optimal amount of solid lubricant is retained by the surface, minimizing the raw material waste and potential cleanliness issues in the end use.

With the traditional Triboconditioning® method, significant technical challenges may be encountered with tool alignment, tool load equilibration, and working face wear compensation. In particular, special tool designs are required to minimize part twisting under applied load, to modulate the tool load to maintain a constant contact pressure, and to maintain the tool/workpiece contact in a constant condition. This hampers the use of the method for treatment of geometrically complex parts exhibiting surfaces with uneven curvature and material thickness.

It is therefore a need for improved methods for treatment of geometrically complex parts exhibiting surfaces with uneven curvature and material thickness.

SUMMARY

A general object of the present technology is to provide improved methods and devices for solid lubricant formation by mechanochemical surface methods.

The above object is achieved by methods and devices according to the independent claims. Preferred embodiments are defined in dependent claims.

In general words, in a first aspect, a method for induced formation of solid lubricant on an article comprises providing of an article to be processed. The article is exposed to a chemically reactive process fluid and impact media. The chemically reactive process fluid comprises a solvent and additives of solid-lubricant precursor substances. The solvent is a low-volatile high-flash solvent. The additives of solid-lubricant precursor substances comprise surface-reactive compounds serving as carriers of at least one of S, P, B and surface-reactive compounds serving as carriers of at least one refractory metal and/or oil soluble metal carboxylates in combination with sulfurized additives. The impact media being non-abrasive hard particles. A velocity difference between surfaces of the article and the impact media is created. This causes impacts between the impact media and the surfaces of the article, giving a burnishing action. Solid lubricant substances are formed on the surfaces of the article by chemical reactions. The chemical reactions comprise the solid-lubricant precursor substances and are induced by the energy of the impacts in the presence of said chemically reactive process fluid. The chemical reactions take place at the surfaces of the article.

In a second aspect, a device for inducing formation of solid lubricant on an article comprises an exposure tank. The exposure tank has an inlet for a chemically reactive process fluid and impact media. The chemically active process fluid comprises a solvent and additives of solid-lubricant precursor substances. The solvent is a low-volatile high-flash solvent. The additives of solid-lubricant precursor substances comprise surface-reactive compounds serving as carriers of at least one of S, P, B and surface-reactive compounds serving as carriers of at least one refractory metal and/or oils soluble metal carboxylates in combination with sulfurized additives. The impact media being non-abrasive hard particles. The device for inducing formation of solid lubricant on an article further comprises an article holder arrangement for the article arranged within the exposure tank and an arrangement for creating a velocity difference between surfaces of the article and the impact media.

One advantage with the proposed technology is that it allows to process dissimilar components using a same finishing equipment and medium composition. Also, different components can be treated simultaneously in a same batch. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 1 is an illustration of runnability window for a conventional Triboconditioning® process;

FIGS. 2A-C illustrate tool control challenges associated with conventional Triboconditioning® process on shaped articles;

DETAILED DESCRIPTION

Figure 3:
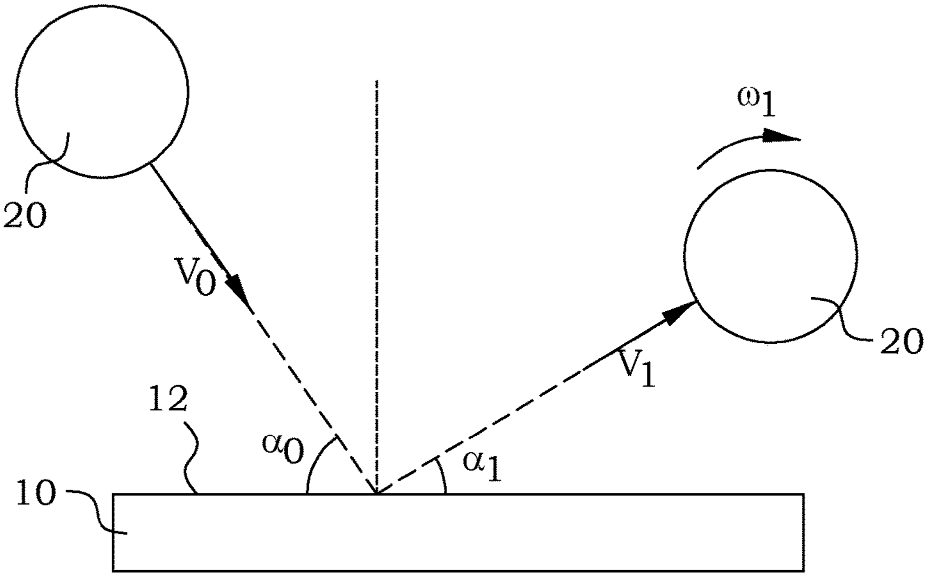
FIG. 3 illustrates the mechanics of oblique-angle mechanical impact.

Throughout the drawings, the same reference numbers are used for similar or corresponding elements.

For a better understanding of the proposed technology, it may be useful to begin with a brief overview of conditions of the traditional Triboconditioning® process. In the traditional Triboconditioning® process, the process runnability window is typically to be empirically found for each individual application. Basic variables are tool sliding speed, contact pressure and treatment time. The product of speed times contact pressure defines the frictional energy flux, given e.g. as $J/m^2s$. The contact pressure must be high enough to trigger plastic deformation of surface asperities but not too high, to prevent any workpiece deformation. For a given contact pressure, the sliding speed must be high enough to provide enough energy for the tribochemical reaction activation, but not too high to prevent overheating and workpiece damage. This is schematically illustrated in FIG. 1. A minimum energy for initiating a triboreaction is illustrates by the dotted line 100. Contact pressures exceeding this limit provide the necessary conditions for forming solid lubricant substances from precursor substances being available at the contact point. The dotted line 101 indicates a practical limit, where the applied contact pressure comes so close to the material yield stress that damages to the article cannot be excluded. The Y axis of the diagram denoted the number of passes between a single point at the article and the tool. This can be expressed e.g. as a tool sliding speed for a fixed cycle time or the number of tool-passes per unit time times the treatment time. A minimum limit 102 can be assigned, which corresponds to a minimum processing time for a sufficient film thickness. A maximum limit 103 can be assigned, where wear, and reagent waste becomes prominent, leading to a low output. Together, these limits define a runnability window 104, within which a high output creation of a useful solid lubricant coating is achieved. For the sake of illustration, the curves 105 indicate the average values of the post-treatment coefficient of friction (CoF) between the 60 HRC 100Cr6 ground steel surface with the initial Ra=0.3 um and a friction probe, which is, in this particular case, a 10 mm 100Cr6 bearing steel ball at a 10N load in a lubricated contact using pure PAO2 base oil as lubricant. The CoF decreases as the surface roughness decreases and the low-friction tribofilm builds up.

Furthermore, as indicated in the background, tool control may be a challenge in the traditional Triboconditioning® process. FIGS. 2A-C illustrates different situations occurring when a cam shaft is to be provided with a conventional Triboconditioning® solid lubricant layer. A Triboconditioning® tool 106 is pressed against the article 10, in this case a cam shaft, having a noncircular cross-section. If the Triboconditioning® tool 106 is pressed with the same force while the cam shaft is rotated. The contact pressure in the different FIGS. 2A-2C will vary and the contact point on the tool 106 will vary as well. In order to ensure constant operation conditions for all surface segments of the article 10, the contacting force thus has to be synchronized with the motion of the article. Preferably, also the direction of the tool 106 with respect to the article should be changed synchronously. Such arrangements are complex and have in many cases to be adapted for each individual article shape.

A request for the chemical reactions of the traditional Triboconditioning® process to occur is that a high pressure and high temperature is available in the volume, in which the chemical reactions are to take place. In the traditional Triboconditioning® process, this is provided by mechanical interaction between the tool and the surface to be treated in a sliding or rubbing relative motion of the tool along the surface to be treated. The energy for the chemical reactions is thereby provided by friction, and not by striking the surface.

However, energy can be provided to a local volume at a surface of an article also in other ways. Replacing fixed tools by a swarm of non-abrasive dispersed impactors colliding with the surface to be treated may provide a high energy transfer. The impactors may for instance be cemented metal carbide balls, ceramic beads, aluminum oxide beads, zirconium oxide beads or the like. In contrast to a continuous tool action, mechanical impacts of small objects are capable to transfer high local forces due to a short impact time. The impact energy can be controlled by the kinetic energy of the impactors. The kinetic energy is proportional to the impactor mass times the impactor velocity squared. The energy flux per unit area is now proportional to the impactor density times the velocity squared times the radius.

The conditions for mechanics of particles of impact media are illustrated in FIG. 3. A particle, typically a bead, of an impact media 20 impinges against a surface 12 of an article 10 with a velocity $V_0$ in an angle $\alpha_0$. After the impact, the particle of impact media 20 leaves the surface 12 with a velocity $V_1$ in an angle $\alpha_1$ and with rotation of $\omega_1$. The impact action thus involves a velocity component towards the surface to be treated before the impact occurs and involves a velocity component away from the surface to be treated after the impact occurred. These changes in dynamics of the particle are caused by the interaction with the surface 12. Elastic and inelastic deformations are caused in the surface 12 as a result of the local pressure at the impact point, which at least to a part will give rise to a temperature increase at the surface 12. The friction between the particle 20 and the surface 12 may also impose changed rotational conditions for the particle 10.

It is estimated that an energy flux transferred at impact areas of the surfaces 12 exceeding 1 $MJ/m^2s$, and preferably exceeding 5 $MJ/m^2s$. could in general be sufficient for inducing a formation of solid lubricant substances. However, for particular choices of process parameters and/or for particular types of articles, even lower energy fluxes may be useful.

At the same time, the energy flux transferred at the impact areas of the surface 12 should not be too large, since it could favor different unwanted wear processes. Presently, it is believed that in general cases, an energy flux exceeding 250 $MJ/m^2s$, and preferably even 50 $MJ/m^2s$, should be avoided. However, as for the lower energy flux limit, even higher energy fluxes may be operable for particular choices of process parameters and/or particular articles.

It has been found that a larger transfer of initial kinetic energy into heat occurs if the velocity of the impact media 20 has a non-zero component parallel to the surface 12. In other words, if the angle $\alpha_0$ is different from 90 degrees, more energy of the impact media 20 may be used for causing chemical reactions. This is probably due to the increased importance of friction contributions at smaller angles $\alpha_0$. If there is a controllability of the velocity direction of the impact media 20 relative to the surface 12, it may be possible to select the energy transfer ratio.

If solid-lubricant precursor substances suitable for formation of solid lubricant substances are present at the article surfaces and the energy flux provided by the impact media is sufficient to induce chemical reactions comprising the solid-lubricant precursor substances, solid lubricant substances similar to the ones produced by traditional Triboconditioning® process may be formed at the surfaces of the article.

Figure 4:
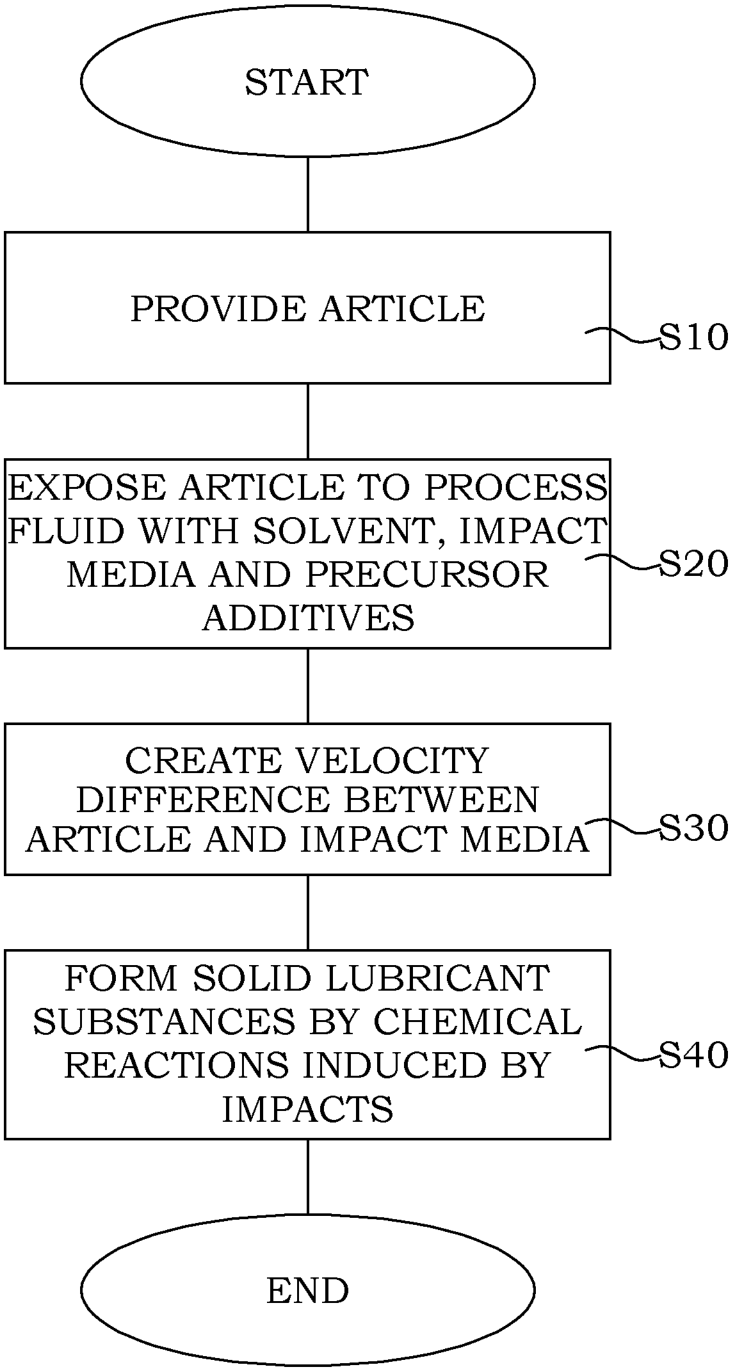
FIG. 4 is a flow diagram of steps of an embodiment of a method for induced formation of solid lubricant on an article.

FIG. 4 is a flow diagram of steps of an embodiment of a method for induced formation of solid lubricant on an article. In step S10, an article to be processed is provided. The article may be of any material used for mechanical contact purposes, typically a metal or metal alloy. Preferably, since solid lubricants based on S, P, B often also reacts with iron, the material in the article comprises iron. In step S20, the article is exposed to a chemically reactive process fluid and impact media. The chemically reactive process fluid comprises a solvent and additives of solid-lubricant precursor substances. The solvent is a low-volatile high-flash solvent. The additives of solid-lubricant precursor substances comprise surface-reactive compounds serving as carriers of at least one of S, P, B and surface-reactive compounds serving as carriers of at least one refractory metal and/or oil soluble refractory metal carboxylates. The impact media are non-abrasive hard particles. These hard particles are typically beads, balls, pins, etc. made of ceramics or cemented metal carbides that may come in a broad range of shapes and sizes. Preferred embodiments are discussed further below. In step S30, a velocity difference between surfaces of the article and the impact media is created. This velocity difference is used to cause impacts between the impact media and the surfaces of the article. Different approaches for achieving the velocity difference are discussed in further detail below. In step S40, solid lubricant substances are formed on the surfaces of the article by chemical reactions comprising the solid-lubricant precursor substances. These chemical reactions are induced by the energy of the impacts. The chemical reactions take place at the surfaces of the article. Preferably, the step of forming of solid lubricant substances is performed by chemical reactions further comprising surface substances of the surfaces of the article.

Methods and devices for creating velocity differences between surfaces of an article and impact media are, as such, known in prior art. Manufacturing processes, such as mass finishing, utilizes velocity differences between impact media and a surface. The term "mass finishing" refers to a group of manufacturing processes that allow large quantities of parts to be simultaneously finished. The two main types of mass finishing are tumble finishing, also known as barrel finishing, and vibratory finishing. The goal of this type of finishing is to burnish, deburr, clean, radius, de-flash, descale, remove rust, polish, brighten, surface harden, prepare parts for further finishing, or break off die cast runners. In other words, mass finishing uses a grinding contact between the workpiece and the finishing medium surfaces to achieve a desired surface finish quality for the workpiece. A variety of finishing media types can be used. Mass finishing can be performed dry or wet. Wet processes use liquid lubricants, coolants or cleaners together with abrasives. Cycle times can vary from minutes to hours depending on the process conditions, workpiece material and the finishing medium used. A mass finishing process can be run either as a batch process or as a continuous process, and may also be sequenced, which involves running the workpieces through multiple different mass finishing stages.

Mass finishing methods generally comprise a surface treatment, where some surface material typically is removed from the surface. This abrasive action may be combined with treatment of the remaining part of the surface, e.g. by surface hardening. However, mass finishing methods are generally not involved in surface coating processes.

However, similar approaches, where an article surface is coated are also available in prior art, as briefly discussed in the background, e.g. fine particle peening, fine particle shot peening, and ultra-fine shot peening. This is typically performed by adding a solid lubricant to the shot medium, or by using the solid lubricant powder as the shot medium itself. In these methods, the substances intended for coating the article are provided, as such, as shot medium or provided at the shot medium. No additives of any solid-lubricant precursor substances in the form of surface-reactive compounds into any process liquid are used.

In contrast to well-known chemically accelerated vibratory finishing, such as chemical-mechanical polishing (CMP) processes used in the semiconductor industry or isotropic superfinishing (ISF) used in mechanical engineering, the function and composition of reactive fluids used by the presently proposed process are totally different. Unlike CMP and ISF fluids, process fluids of the present technology are not expected to chemically etch the surface to speed up the process. Instead, their primary function is to provide chemistries for the tribofilm generation, as well as optional complimentary corrosion protection and detergent functions favoring process stability. It may therefore be noted that the traditional Triboconditioning® process as well as the present technology conceptually differs from chemically accelerated vibratory finishing in the composition and the function of process fluid, as well as the characteristics of finished surfaces.

In the present technology, high density impact media tend to produce higher impact pressure than low density impact media. An oblique impact angle can be used to induce sliding action while a straight angle impact can be used to maximize the impact pressure. Different impact media shapes can also be used if needed.

Centrifugal and vibratory equipment is proved to be suitable for running the presently presented treatment using small balls or beads made of cemented metal carbides, nitrides, zirconium oxide, or ceramics. Cemented tungsten carbide balls having a density of 9-15 g/cm$^3$, sintered silicon nitride beads having a density of 3.2-3.4 g/cm$^3$, zirconium oxide beads having a density of 5.6-5.8 g/cm$^3$, and sintered bauxite balls having a density of g/cm$^3$ have all been advantageously used as impact media.

Preferred ball size in these cases were from 1 to 5 mm. Smaller size is required to treat concave surfaces, for instance, to access tooth flanks and bottom lands in the case of large diametral pitch gears.

Balls made of tungsten heavy alloys, with a density up to 18 g/cm$^3$ have also been used as impact media.

Furthermore, to impart a mild abrasive action, silicon nitride or tungsten carbide powder slurries (particle size 0.1 to 250 um) can be used in place of, or in addition to, other impact media, for instance the impact media examples listed above. The use of cemented tungsten carbide media is specially preferred as it reveals an unexpected effect due to carbide nanoparticles being released from the media and encrusted onto the workpiece surface. The possibility of nanoparticle encrustation has previously been described for nanodiamonds, see Jiang X et al, in Mechanistic features of nanodiamonds in the lapping of magnetic heads. Scientific World Journal. 2014 (2014) 326427. However, it was very surprising to happen during the solid lubricant formation processes using sintered ceramic media as impact media. The presence of embedded tungsten carbide nanoparticles at the surface of treated parts has been confirmed by SEM-EDX analysis. Such particles have a beneficial effect on the run-in performance and wear resistance of treated parts.

In other words, in one embodiment, the impact media comprise cemented metal carbides, metal nitrides, zirconium oxide, ceramics and/or tungsten heavy alloys. Preferably, the sizes of the impact media were from 1 to 5 mm.

In one embodiment, the impact media comprise silicon nitride or tungsten carbide powder. In a further embodiment, the impact media comprise cemented tungsten carbide powder. Preferably, the particles of the silicon nitride or tungsten carbide powder have an average size in the interval of 0.1 to 250 μm.

The present process is a wet process involving a chemically reactive process fluid in which impact media is provided. The process fluid comprises a solvent and additives of solid-lubricant precursor substances. The solvent is a low-volatile high-flash solvent. This enables the impact media to be used in the presence of reactive fluids providing reagents for the tribochemical reaction.

The preferred fluid choice depends upon individual application requirements and the devices used. For instance, when working with low density impactors, such as bauxite or silicon nitride balls, a low viscosity neat oil type fluid is preferred, since the conventional fluid of higher viscosity provides excessive impact damping effect. Further, when some level of corrosion protection is essential together with improved tribology, a water-borne zirconium-phosphate-based formulation may be chosen. Many particulate systems, such as graphene, colloidal titanium oxide and inorganic fullerene like structures can also be deployed, both in water- and oil-based formulations, to achieve specific performance goals.

In one embodiment, the solvent comprises mineral oil and spirits, synthetic polyalphaolefins, isoparaffins, alkylated naphthalenes, esters, ethers, alcohols, carboxylated or alkoxylated polyols, water and/or ionic liquids.

In one embodiment, the solvent is selected to have a kinetic viscosity at 40° C. of less than 50 cSt, and preferably less than 10 cSt.

Some non-exclusive examples of suitable fluid formulations are shown below:

Neat Oil Type 1

| | |
|---|---|
| Polyalphaolefin 2 (Durasyn 162, INEOS) | 43 |
| Alkylated naphthalene 8 (Na-lube KR-008, King Industries) | 33 |
| Oil soluble organotungstate (Vanlube W324, Vanderbilt) | 20 |
| Sulfurized olefin (Anglamol 33, Lubrizol) | 2 |
| Zinc dialkyl dithiophosphate (Lubrizol 1371, Lubrizol) | 2 |
| Antifoam (Viscoplex 14-520, Evonik) | 200 ppm |

Properties:

Kin. visc @40 C=14.1 cSt; Specific gravity=0.88 g cm-3

Neat Oil Type 2 (Low Viscosity)

| | |
|---|---|
| Naphtha (Exxol D100, ExxonMobil) | 86 |
| Oil soluble organotungstate (Vanlube W324, Vanderbilt) | 10 |
| Sulfurized olefin (Additin RC 2540, Rhein Chemie) | 2 |
| Zinc dialkyl dithiophosphate (Lubrizol 1371, Lubrizol) | 2 |
| Antifoam (Viscoplex 14-520, Evonik) | 200 ppm |

Properties:

Kin. visc @40 C=3.6 cSt; Specific gravity=0.83 g cm-3

Water-Borne Fluid

| | |
|---|---|
| Phosphoric acid, 85% aq. solution | 15 g |
| Zirconium phosphate, powder | 30 g |
| Zinc nitrate hexohydrate, powder | 15 g |
| Water | 940 g |

Typical solvent specific gravity is within the range 0.5 to 1.5 g/cm$^3$.

The additives of solid-lubricant precursor substances are, as stated above, surface-reactive compounds serving as carriers of at least one of S, P, B and surface-reactive compounds serving as carriers of at least one refractory metal. These are the types of precursor substances that also are operable for traditional Triboconditioning® processes.

In one embodiment, the surface-reactive compounds serving as carriers of at least one refractory metal are salts and/or organocomplexes.

In one embodiment, the refractory metal is Mo and/or W.

In a further embodiment, where surface-reactive compounds comprise W, the surface-reactive compounds serving as carriers of at least one refractory metal are preferably simple tungstates, thiotungstates, tungsten dithiocarbamates, tungsten dithiophosphates, tungsten carboxylates and dithiocarboxylates, tungsten xanthates and thioxanthates, polynuclear tungsten complexes containing carbonyl, cyclopentadienyl and sulfur as ligands, halogen containing complexes of tungsten with pyridine, bipyridine, nitriles and phosphines as ligands, and/or adducts of tunstic acid with fatty glycerides, amides and amines.

In a further embodiment, where surface-reactive compounds comprise Mo, the surface-reactive compounds serving as carriers of at least one refractory metal are preferably simple molybdates, thiomolybdates, molybdenum dithiocarbamates, molybdenum dithiophosphates, molybdenum carboxylates and dithiocarboxylates, molybdenum xanthates and thioxanthates, polynuclear molybdenum complexes containing carbonyl, cyclopentadienyl and sulfur as ligands, halogen containing complexes of molybdenum with pyridine, bipyridine, nitriles and phosphines, and/or adducts of molybdic acid with fatty glycerides, amides and amines.

In one embodiment, the surface-reactive compounds serving as carriers of at least one of S, P, B is a surface-reactive compounds serving as carriers of S. The surface-reactive compound serving as carriers of S may in one embodiment be elementary sulfur. Alternatively, or in combination, the surface-reactive compounds serving as carriers of S are organic sulfides and/or organic polysulfides. Preferably, the surface-reactive compounds serving as carriers of S are dibensyldisulfide, sulfurized isobutene, sulfurized fatty acids and/or dialkylpolysulfides.

The refractory metals and S, P and/or B form different compounds, possibly also comprising iron from the article surface. Such compounds are typically easily shearable and present therefore advantageous solid lubricating properties. These compounds are typically relatively similar to e.g. molybdenum disulfide or tungsten disulfide or similar compounds based on P or B. However, due to the inhomogeneous conditions at the article surface and the possibilities to include also the elements originally at the article surface in the chemical reaction, the formed compounds could be of a range of uncharacterizable compounds bonded to the article surface with varying strength.

It is also possible to use substances that are carriers for both refractory metals and S, P and/or B. In other words, in one embodiment, the surface-reactive compounds serving as carriers of at least one refractory metal and the surface-reactive compounds serving as carriers of at least one of S, P, B are both thiocarbamate, thiophosphate, and/or thioxanthate.

Another group of solid-lubricant precursor substances comprise oil soluble metal carboxylates. In particular, when used in combination with sulfurized additives, such as sulfurized fats, sulfurized acids, dialkyl- and diaryl-polysulfides, sulfurized olefins etc., overbased carboxylates of copper and zinc have proven to give rise to solid lubricant compounds, such as metal sulfides.

The basic idea of the present technology for providing high energy levels to a limited surface area of an article is to utilize a collision between a large number of impact media particles and the article to be treated. The collisions are caused by creating a velocity difference between the impact media and the article and letting the respective paths cross. This can be obtained in different ways.

In one embodiment, a device for inducing formation of solid lubricant on an article comprises an exposure tank, an article holder arrangement for the article arranged within the exposure tank and an arrangement for creating a velocity difference between surfaces of the article and the impact media. The exposure tank has an inlet for a chemically reactive process fluid and impact media. The chemically active process fluid comprises a solvent and additives of solid-lubricant precursor substances. The solvent is a low-volatile high-flash solvent. The impact media comprise non-abrasive hard particles. The additives of solid-lubricant precursor substances are surface-reactive compounds serving as carriers of at least one of S, P, B and surface-reactive compounds serving as carriers of at least one refractory metal.

Figure 5A:
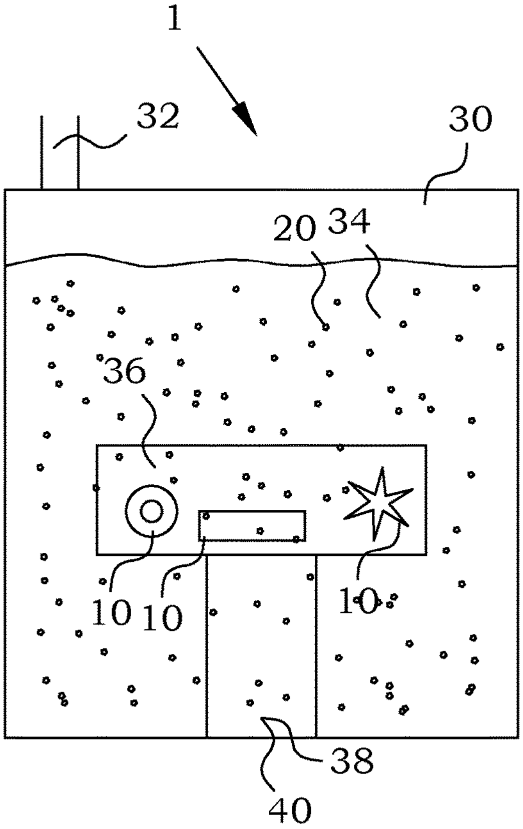
FIGS. 5A-B are schematic illustrations of embodiments of devices for inducing formation of solid lubricant on an article based on vibrational movements.

FIG. 5A illustrates one possible realization of an embodiment of a device 1 for inducing formation of solid lubricant on an article. This embodiment is based on obtaining velocity differences by means of vibrations. The device 1 for inducing formation of solid lubricant on an article comprises an exposure tank 30, with an inlet 32 for a process fluid 34 and impact media 20. The process fluid 34 comprises a solvent and additives. Only a small fraction of the impact media 20 are illustrated. An article holder arrangement 36 is arranged within the exposure tank 30 for supporting articles 10 to be treated. The article holder arrangement 36 is arranged for allowing streaming process fluid to reach the surfaces of the articles 10. An arrangement 40 for creating a velocity difference between surfaces of the article 10 and impact media 20 in the exposure tank 30 comprises in this embodiment a vibrator 38. The vibrator 38, when activated, causes the article holder arrangement 36 and its content of articles 10 to vibrate relative to the process fluid 34. In other words, the arrangement 40 for creating a velocity difference comprises means for vibrating the article holder arrangement 36.

Figure 5B:
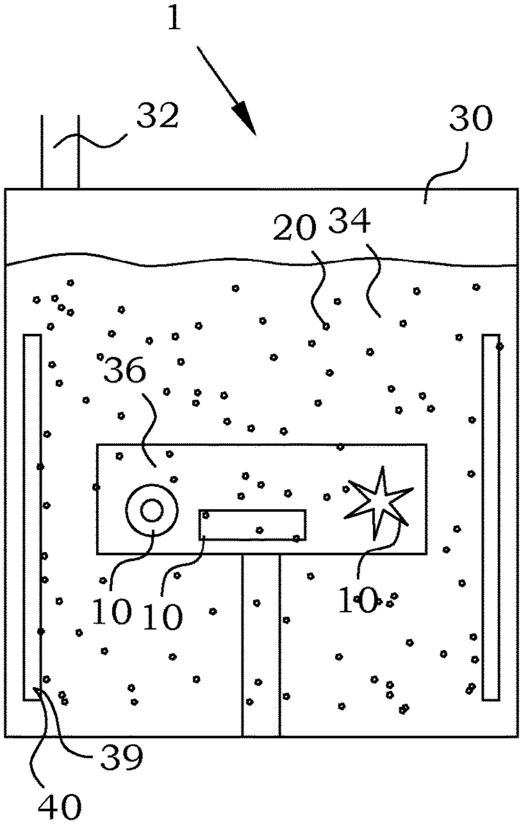

FIG. 5B illustrates another embodiment of a device 1 for inducing formation of solid lubricant on an article. This embodiment is also based on obtaining velocity differences by means of vibrations. Most parts are similar to the previous embodiment. However, in this embodiment, the arrangement 40 for creating a velocity difference between surfaces of the article 10 and impact media 20 in the exposure tank 30 comprises two vibrator plates 39. The vibrator plates 93 are arranged for imposing a vibration movement to the process fluid 34 in the exposure tank 30, and in particular to the impact media 20 provided therein. In other words, the arrangement 40 for creating a velocity difference comprises means for vibrating the process fluid 34.

If the energy of the process is requested to be increased further, the article holder arrangement 36 may be movable within the exposure tank 30, to force the articles 10 through the vibrating impact media.

In a further embodiment, the principles of FIGS. 5A and 5B can be combined, vibrating both the article holder arrangement 36 as well as the process fluid 34.

Figure 6A:
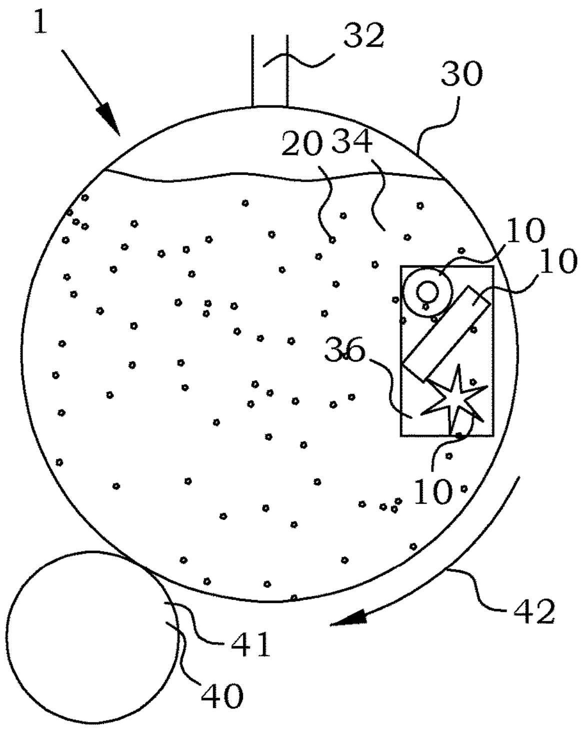
FIGS. 6A-B are schematic illustrations of embodiments of devices for inducing formation of solid lubricant on an article based on rotational movements.

FIG. 6A illustrates another embodiment of a device 1 for inducing formation of solid lubricant on an article. This embodiment is based on obtaining velocity differences by means of rotations. Most parts are similar to the previous embodiments. However, the exposure tank 30 is here a cylinder that is enabled to be rotatable around a horizontal axis. In this embodiment, the arrangement 40 for creating a velocity difference between surfaces of the article 10 and impact media 20 in the exposure tank 30 comprises a motor 41, arranged for rotating the exposure tank and thereby giving also the process fluid 34 and the impact media 20 therein a rotational motion. In other words, the arrangement 40 for creating a velocity difference comprises means for rotating the process fluid 34.

Figure 6B:
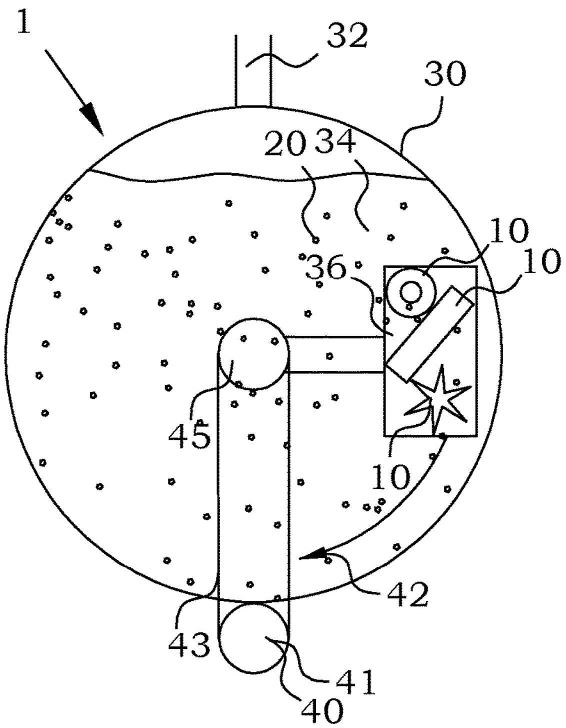

FIG. 6B illustrates another embodiment of a device 1 for inducing formation of solid lubricant on an article. This embodiment is also based on obtaining velocity differences by means of rotations. Most parts are similar to the previous embodiment. However, article holder arrangement 36 is here connected to a rotatable shaft 45. The motor 41 here drives the shaft 45 by driving means 43, resulting in that the article holder arrangement 36 is rotated around in the exposure tank. In other words, the arrangement 40 for creating a velocity difference comprises means for rotating article holder arrangement 36.

In a further embodiment, the principles of FIGS. 6A and 6B can be combined, rotating the article holder arrangement 36 as well as the process fluid 34, in opposite directions.

Rotation-based principles for achieving the velocity difference, i.e. centrifugal approaches, tend to deliver higher impact energies compared to vibrational approaches. In particular if opposite direction rotated process fluid and article holder arrangement is used, an efficient formation of solid lubricant substances is typically relatively easy to obtain.

Figure 7:
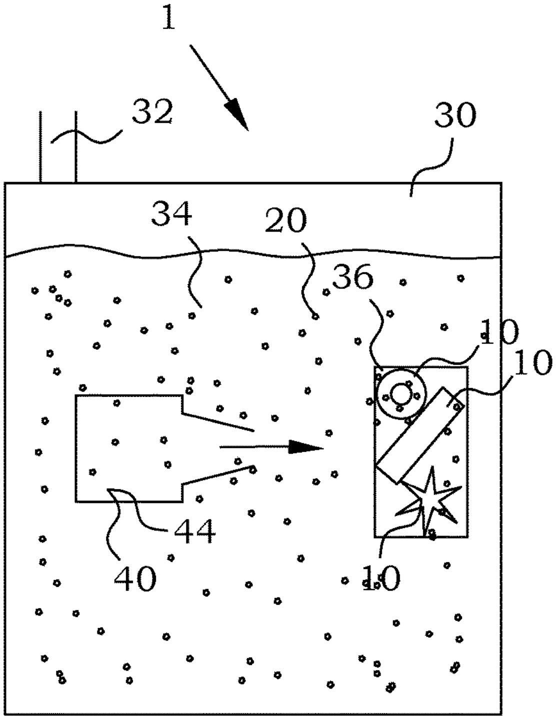
FIG. 7 is a schematic illustration of an embodiment of a device for inducing formation of solid lubricant on an article based on directing an impact media flow.

FIG. 7 illustrates another embodiment of a device 1 for inducing formation of solid lubricant on an article. This embodiment is based on obtaining velocity differences by means of directed particle flows. As the arrangement 40 for creating a velocity difference, a means 44 for directing a media flow against the surfaces of the articles is used. Typically, a pressurizer combined with a nozzle may be used. The article holder arrangement 36 may be stationary, e.g. if a certain angle of incidence for the impact media is required. Alternatively, the article holder arrangement 36 may be displaced and/or rotated to expose different surfaces to the media flow. In other words, the arrangement 40 for creating a velocity difference comprises means 44 for directing a media flow against the surfaces of the articles.

In rotational and vibrational approaches, stochastic motion of the impact media and articles past each other is achieved. This also results in a solid lubricant formation that is more or less stochastic concerning directions. By using a directed impact media flow around a fixed article, flow conditions such as impinging angles and selectively exposed surfaces can be controlled. The article can e.g. be mounted at a certain angle or rotated to preferentially expose different surfaces to impact media impacts. This allows a better control over the total process.

Different combinations of impact media, process fluid and treatment settings can be used to achieve a different output, depending on the desired properties for specific applications.

In a method or process view, in one embodiment, the velocity difference has a non-zero component parallel to the surfaces of the article.

In one embodiment, impacts between the surfaces of the article and the impact media created an energy flux at impact areas of the surfaces of the article exceeding 1 $MJ/m^2s$, and preferably exceeding 5 $MJ/m^2s$.

In one embodiment, the impacts between the surfaces of the article and the impact media created an energy flux at impact areas of the surfaces of the article being lower than 250 $MJ/m^2s$, and preferably lower than 50 $MJ/m^2s$.

In one embodiment, the step of creating a velocity difference comprises a relative rotation between the process fluid and the article.

In one embodiment, the step of creating a velocity difference comprises a relative vibration between the process fluid and the article.

In one embodiment, the step of creating a velocity difference comprises directing a media flow against the surfaces of the article.

As a more detailed embodiment, a process setup suitable to run the present treatment using a centrifugal barrel equipment is described here below. The workpiece, i.e. the article to be treated, is placed inside a barrel, together with impact media and reactive process fluid, comprising the solvent and the necessary additives. The combined fill rate of impact media and fluid inside the barrel is 50-90%, of which the impact media fill rate is 20-80%, but preferably 40-60%.

The barrels sit in cradles which are mounted on a turret. The turret rotates around a horizontal axis, creating a Ferris wheel-like motion with a one-to-one ratio of barrel rotation to turret rotation. Inside the barrels, the rotating motion induces collisions between impact media and workpiece, altering the surface conditions of the workpiece. Heat from the impact media-workpiece collisions also sparks a chemical reaction between the workpiece and the process fluid. The amount of heat created is dependent on turret rotation speed, impactor size and density, and workpiece dimensions.

The process kinetics depends on barrel and turret dimensions. For barrels of 20 cm diameter, and turret of 60 cm diameter, the turret should typically rotate at 150-220 rpm. 160-180 rpm has been found to be the optimal window for heavy density media (e.g. cemented metal carbides), while 180-200 rpm is preferred for media with lower density. The speed scales up with dimensions to keep the factor "diameter×rpm squared" constant. The treatment time can vary from a few minutes up to an hour, but in most cases the 10-30-minute interval is targeted.

When evaluating the results of the method described here above, different aspects, such as surface roughness, compressive stress and noise excitation were considered.

Surface roughness parameters are defined according to established standards for geometric dimensioning and tolerancing (GD&T) defined by ISO/TC 213. The presence of a tribofilm is established by applicable surface chemical analysis methods, such as scanning electron microscopy with energy dispersive X-ray spectroscopy (SEM-EDS), X-ray photoelectron spectroscopy (XPS) or X-ray fluorescence (XRF). Residual stress measurements are carried out using a traditional X-ray diffraction method.

Figure 8A:
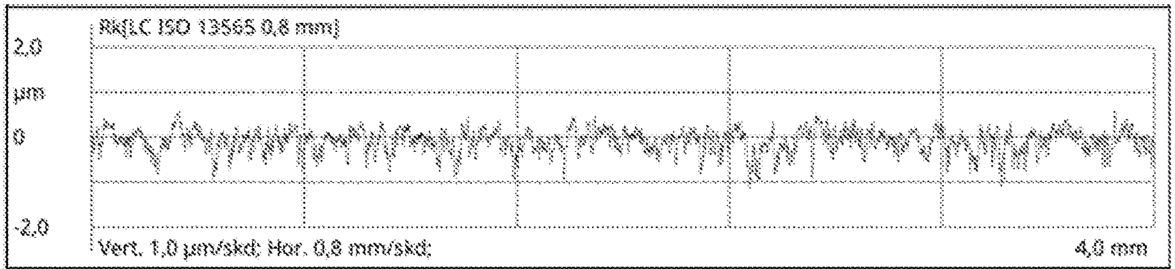
FIG. 8A illustrates a test pin surface profile before a treatment with the present method.
Figure 8B:
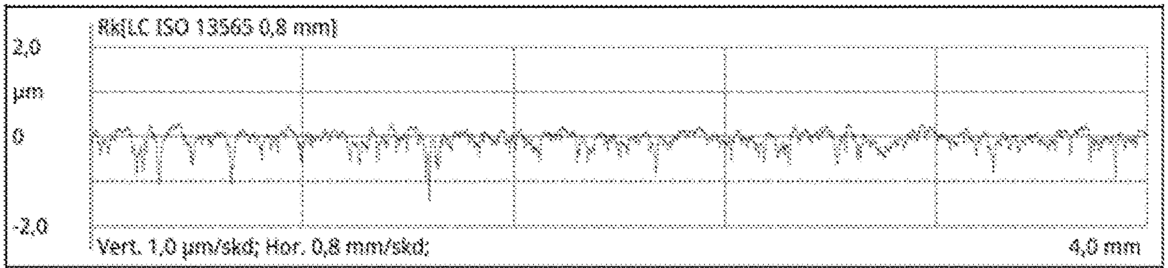
FIG. 8B illustrates a test pin surface profile after a treatment with the present method.

The method presented above does not only provide a solid lubricant film, but it does also slightly modify the surface of the article. An example of typical surface roughness profile modification produced by the surface treatment method described herein is shown in FIGS. 8A and 8B. FIG. 8A illustrates a test pin surface profile before treatment and FIG. 8B illustrates a similar test pin surface profile after treatment.

Significant reduction in amplitude roughness parameters (Ra, Rz, Rpk, Rk) and development of a plateau-like surface roughness profile characterized by an increasingly negative skewness (Rsk) as a result of the treatment should be highlighted. Besides that, gradient roughness decreases, as witnessed by a drop in the Aq value measured by angle-resolved light scattering. In the boundary lubrication regime that takes place at high loads, surface asperities come into direct contact with each other and are deformed during the contact. The resulting coefficient of friction is proportional to the energy required to deform the asperities. This energy is in its turn proportional to the product of the deformation amplitude squared times the number of asperities per unit of length. The deformation amplitude relates to the amplitude roughness (expressed via Rk) and the number of asperities per unit of length relates to the gradient roughness (expressed via Rdq or Aq). Therefore, one can decrease frictional losses by decreasing both the gradient and amplitude roughness.

Figure 9:
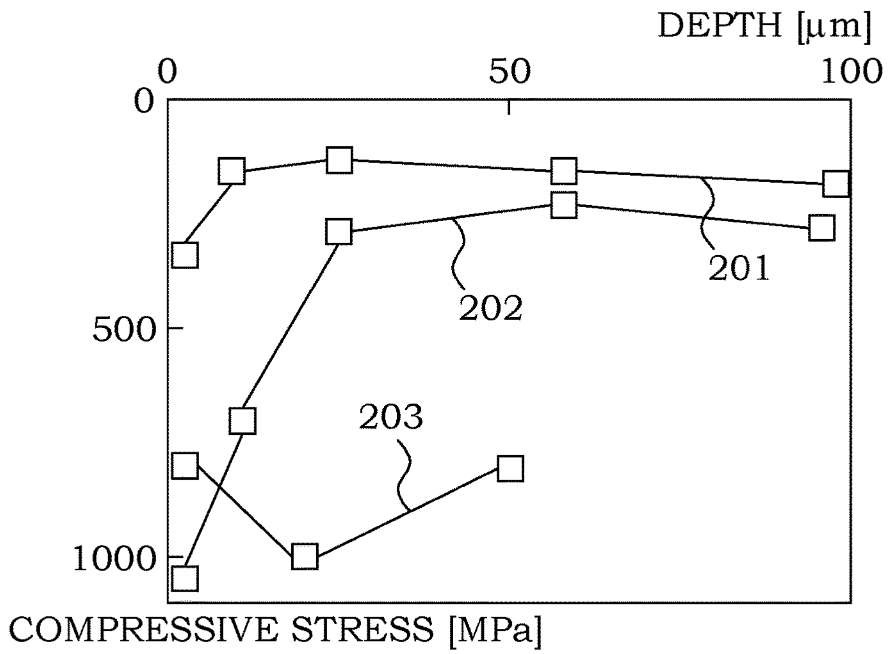
FIG. 9 is a diagram presenting results of compressive stress measurements.

By analogy with the traditional Triboconditioning® process carried out as a fixed-tool machining operation according to the published international patent application WO 2012/008890 A1, the new method presented here also impart surface compaction due to plastic deformations in the sub-surface material layer stretching up to 10-20 μm in depth. This can be linked to the deformation hardening phenomenon obtained by shot-peening, deemed to be beneficial for the component tribology, see e.g. K. Tosha, Influence of residual stresses on the hardness number in the affected layer produced by shot peening, Proc. $2^{nd}$ Asia-Pacific Forum on Precision Surface Finishing and Deburring Technology, Seoul, Korea, July 2002, pp. 48-54. In FIG. 9, compressive stress profiles of two examples of surface treatment according to the present technology, based on rotational relative motion 201 and directed impact media flow 202, respectively, are shown. Surface compaction down to a depth of 10-20 μm can be seen. As a reference, surface compaction caused by shot-peening 203 is also illustrated. The example using directed impact media flow 202 had an even higher compaction than the shot-peening at the outermost parts.

In one test, bevel gears were treated with the goal of achieving noise reduction. The treatment resulted in reduced surface roughness with increasingly negative skewness. Ra decreased from 0.65 to 0.49, Rz decreased from 3.67 to 2.85, Rpk decreased from 0.71 to 0.53, Rk decreased from 1.7 to 1.08 and Rvk decreased from 1.99 to 1.85. Furthermore, an increase in compressive stress from 900 to 1400 MPa was determined. These changes contributed to a significantly reduced noise excitation. At 60° C., the maximum noise level decreased from 68 dB to 63 dB.

Figure 10A:
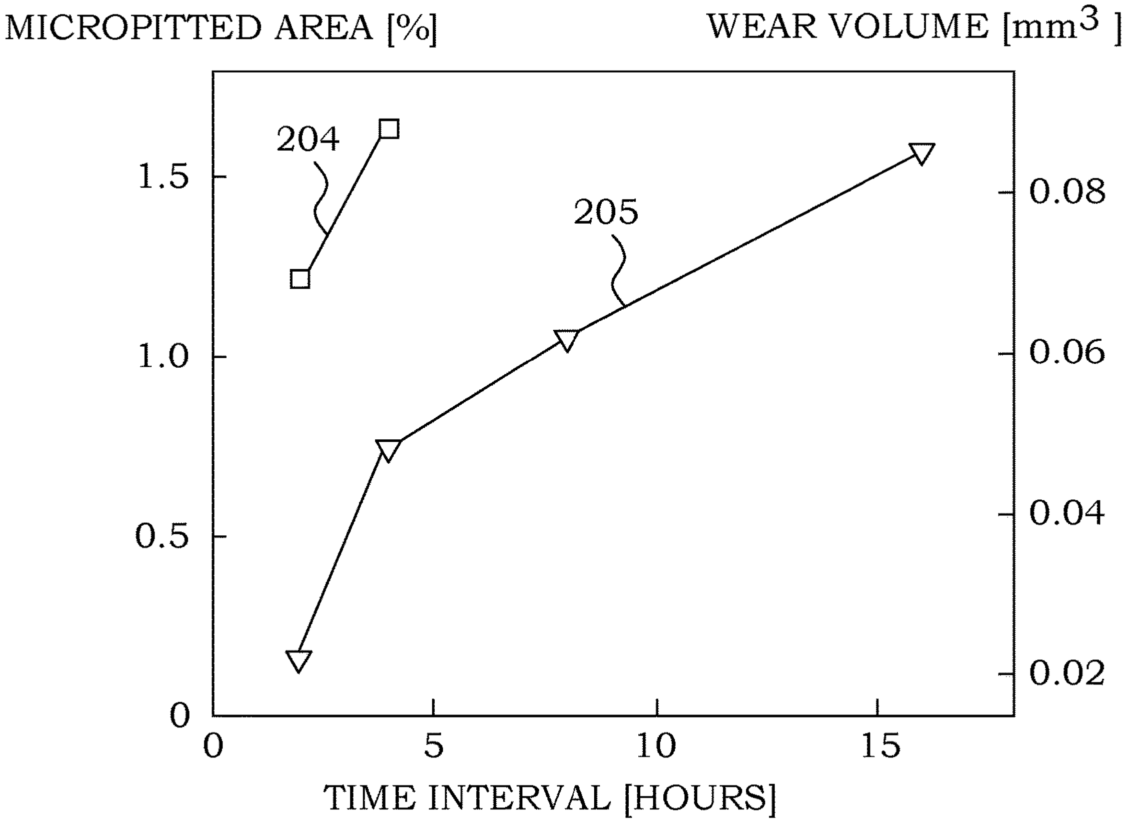
FIG. 10A is a diagram illustrating micropitted area and wear for a non-treated article in a twin-disc test.
Figure 10B:
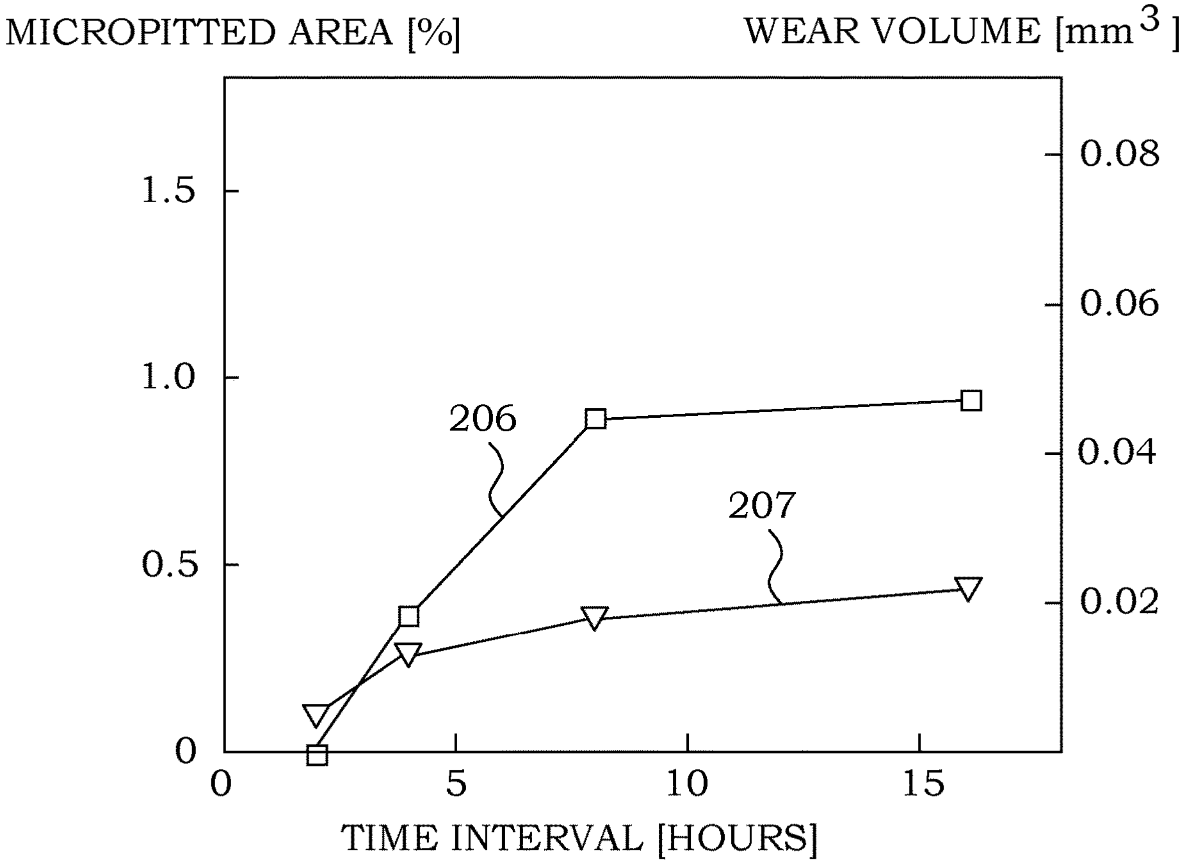
FIG. 10B is a diagram illustrating micropitted area and wear for a treated article in the twin-disc test.

In another test, micropitting and wear were investigated by use of a twin-disc test for a non-treated article and an article treated by the above described methods. The results are illustrated in FIGS. 10A and 10B. In FIG. 10A, a non-treated article was run in the twin-disc test presenting an early and extensive creation of micropitting, corresponding to curve 204. At the same time, high degrees of wear, curve 205, was found. A corresponding test was performed after treatment by the above described methods and the results are illustrated in FIG. 10B. The initiation time for micropitting increased, curve 206, and wear decreased, curve 207, compared to the non-treated article.

High-speed transmission gears are articles that would benefit from treatments according to the present technology. To that end, tests on ears were performed. FZG (Forschungsstelle für Zahnräder und Getriebebau) scuffing load tests A/8.3/90 as per ASTM D 5182 were carried out using the standard A-profile gears with different surface finishes. Standard FZG gears (Ra 0.3-0.7 um) were used as a reference. Isotropically finished (ISF) gears (Ra 0.03 um) and mechanochemically finished gears (Ra 0.1 um) according to the here presented principles were investigated. Two different gear oil types were compared; a commercial SAE 75W-90 API GL-5 hypoid oil, and a specially formulated viscosity-matched additive-free oil. With the GL-5 oil, no difference in the scuffing load was observed-all gears showed no scuffing up to the final loading stage. However, isotropically finished and mechanochemically finished gears demonstrated the lowest wear during the test, 10 and 8 mg, compared to 43 mg for the reference. With the additive-free oil, the reference and isotropically finished gears both failed at the loading stage 5, while mechanochemically finished gears survived till the stage 7. This shows that mechanochemical finishing allows one to match wear behavior of isotropically finished gears while increasing scuffing resistance in low-additivated oils, such as dual-clutch transmission (DCT) fluids and e-fluids for electric vehicles. Mechanochemically finished gears according to the principles presented above are thus especially suitable for the use in high-speed gear units.

The above examples present clear evidence that the treatment according to the present technology offers evident advantages compared to prior art, e.g. what can be achieved by classical abrasive mass finishing processes. First of all, the created tribofilm provides low-friction surfaces with enhanced wear resistance. The present method thus delivers the complete spectrum of benefits offered by the traditional Triboconditioning® process since the process produces solid lubricant tribofilms comprising the same chemistries as disclosed in e.g. the published international patent application WO 2012/008890 A1. The compressive stress contributes to beneficiary tribological properties. Secondly, there are also major differences in the surface profile. Negatively skewed surface roughness profiles with reduced gradient and amplitude roughness values are obtained As a comparison, abrasive processes tend to reduce amplitude roughness (Rt, Rz, Ra) but have little effect on gradient roughness (Rdq or Aq). Multistage abrasive processes using progressively finer abrasives may produce negative skewness, but this comes at an extra cost.

The most prominent advantages with the present method are:

A low friction solid lubricant tribofilm is generated by tribochemical reaction with the process fluid during the process.

The workpiece macrogeometry is preserved within applicable specifications.

Surface roughness profile is modified by acquiring negatively skewness (Rsk=−0.5 to −3), reduced Rpk and Rk, and reduced gradient roughness (Rdq or Aq).

A compressive stress (negative residual stress) is generated in the subsurface.

For optimum process stability and consistent quality, before the first use, impact media should preferably be "activated" using a dedicated run-in sequence. The typical run-in sequence duration is 10-20 min under conditions identical to the actual treatment process. The only difference is that no components are loaded into the device, only impact media and process fluid, with impact media elements being activated by rubbing against each other. The process fluid does not necessarily comprise the additives. The run-in sequence generates a lot of particulate matter, hence the impact media should preferably be washed afterwards and fresh process fluid is charged into the device for the subsequent production runs.

In other words, in one embodiment, the method for induced formation of solid lubricant on an article comprises the further step of running-in the impact media before the step of immersing the article into a process fluid. The step of running-in comprises creating a velocity difference between the impact media in the process fluid in absence of the article. This causes impacts between different items of the impact media.

Since the above described processes tend to generate particulate contamination, mainly ferrous and metal ceramic fines originating from impact media and from parts being treated, an adequate fluid management system is preferred for achieving a good process stability and part quality.

The most straightforward fluid regeneration method would have been filtration. Unfortunately, the use of traditional band and precoat filters may not give the desired outcome because such filters are quickly blocked by oleogel composed of fine particulate matter and additive decomposition products. Instead, it has been found that the use of a cascaded system comprising a sedimentation tank or a multiweir system complemented by a cyclone does not have this drawback and allows removing heavy particles while leaving most of the gel in the fluid thus minimizing the additive depletion. After end-of-life is reached, burnishing media should be reconditioned and washed, and fresh fluid charged in the unit. The latter operation is scheduled as a planned maintenance. Under normal use, such a maintenance step is preferably performed after approximately 100-200 treatment cycles, or as soon as one notice a drop in the surface finish quality.

In one embodiment of the device for inducing formation of solid lubricant on an article, the device further comprises a sedimentation arrangement and/or a decanting arrangement for process fluid being used in an inducing formation of solid lubricant, and a cyclone fluidly connected to an outlet from the sedimentation arrangement and/or a decanting arrangement.

In a method aspect, in one embodiment, the method for induced formation of solid lubricant on an article comprises the further step of post-treatment of process fluid, after the steps of creating a velocity difference and forming solid lubricant substances. The step of post-treatment of process fluid comprises sedimentation and/or decanting of the process fluid, followed by treatment of the process fluid in a cyclone.

In one embodiment, the method for induced formation of solid lubricant on an article comprises the further step of separating impact media from process fluid at least partly depleted of the additives of solid-lubricant precursor substances. The impact media is reconditioned. The impact media is thereby preferably washed to remove remaining solvent. Preferably, the impact media is washed in a solvent-based cleaner comprising the same solvent as used in the process fluid plus a dispersant. This reconditioned impact media is reused in a fresh solvent and with additional additives of solid-lubricant precursor substances to form a new process fluid useful in a subsequent solid lubricant formation process.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for induced formation of solid lubricant on an article, comprising the steps of:

providing an article to be processed; and exposing said article to a chemically reactive process fluid;

said chemically reactive process fluid comprising a solvent and additives of solid-lubricant precursor substances;

said solvent being a low-volatile high-flash solvent;

said additives of solid-lubricant precursor substances being at least one of:

surface-reactive compounds serving as carriers of at least one of S, P, B and surface-reactive compounds serving as carriers of at least one refractory metal, and oil soluble metal carboxylates in combination with sulfurized additives;

said step of exposing further comprises exposing said article to impact media;

said impact media being non-abrasive hard particles;

wherein said method comprises the further steps of:

creating a velocity difference between surfaces of said article and said impact media, which causes impacts between said impact media and said surfaces of said article giving a burnishing action; and forming solid lubricant substances on said surfaces of said article by chemical reactions comprising said solid-lubricant precursor substances, induced by the energy of said impacts in the presence of said chemically reactive process fluid;

wherein said chemical reactions take place at said surfaces of said article.

2. The method according to claim 1, wherein said impact media are particles of cemented metal carbides, metal nitrides, zirconium oxide, ceramics and/or tungsten heavy alloys.

3. The method according to claim 1, wherein said impact media are particles of silicon nitride or tungsten carbide powder.

4. The method according to claim 3, wherein said impact media are particles of cemented tungsten carbide powder.

5. The method according to claim 3, wherein said particles of said silicon nitride or tungsten carbide powder have an average size in the interval of 0.1 to 250 μm.

6. The method according to claim 1, wherein said velocity difference has a non-zero component parallel to said surfaces of said article.

7. The method according to claim 1, wherein said impacts between said surfaces of said article and said impact media create an energy flux at impact areas of said surfaces of said article exceeding 1 $MJ/m^2s$.

8. The method according to claim 1, wherein said impacts between said surfaces of said article and said impact media create an energy flux at impact areas of said surfaces of said article being lower than 250 $MJ/m^2s$.

9. The method according to claim 1, comprising the further step of running-in said impact media before said step of exposing said article to said process fluid, wherein said step of running-in comprises creating a velocity difference between said impact media in said process fluid in absence of said article.

10. The method according to claim 1, comprising the further step of post-treatment of process fluid, after said steps of creating a velocity difference and forming solid lubricant substances, said step of post-treatment of process fluid comprising:

sedimentation and/or decanting of said process fluid, followed by treatment of said process fluid in a cyclone.

11. The method according to claim 1, comprising the further steps of:

separating impact media from process fluid at least partly depleted of said additives of solid-lubricant precursor substances;

reconditioning said impact media by washing said impact media to remove remaining solvent; and reusing said reconditioned impact media in a fresh solvent and with additional said additives of solid-lubricant precursor substances to form a new process fluid useful in a subsequent solid lubricant formation process.

12. The method according to claim 11, wherein said reconditioning comprises washing said impact media in a solvent-based cleaner comprising the same solvent as used in said process fluid and a dispersant.

13. The method according to claim 1, wherein said surface-reactive compounds serving as carriers of at least one refractory metal are salts and/or organocomplexes.

14. The method according to claim 1, wherein said step of forming solid lubricant substances is performed by chemical reactions further comprising surface substances of said surfaces of said article.

15. A device for inducing formation of solid lubricant on an article, comprising:

an exposure tank, having an inlet for a chemically reactive process fluid and impact media;

said chemically reactive process fluid comprising a solvent and additives of solid-lubricant precursor substances;

said solvent being a low-volatile high-flash solvent;

said additives of solid-lubricant precursor substances being at least one of:

surface-reactive compounds serving as carriers of at least one of S, P, B and surface-reactive compounds serving as carriers of at least one refractory metal, and oil soluble metal carboxylates in combination with sulfurized additives;

said impact media being non-abrasive hard particles;

an article holder arrangement for said article arranged within said exposure tank; and an arrangement for creating a velocity difference between surfaces of said article and said impact media;

wherein said arrangement for creating a velocity difference is configured for creating an energy flux at impact areas of said surfaces of said article exceeding 1 $MJ/m^2s$ and being lower than 250 $MJ/m^2s$.

16. The device according to claim 15, wherein said arrangement for creating a velocity difference is configured for creating an energy flux at impact areas of said surfaces of said article exceeding 5 $MJ/m^2s$ and lower than 50 $MJ/m^2s$.

17. The device according to claim 15, wherein said arrangement for creating a velocity difference comprises means for rotating at least one of said process fluid and said article holder arrangement.

18. A device for inducing formation of solid lubricant on an article, comprising:

an exposure tank, having an inlet for a chemically reactive process fluid and impact media;

said chemically reactive process fluid comprising a solvent and additives of solid-lubricant precursor substances;

said solvent being a low-volatile high-flash solvent;

said additives of solid-lubricant precursor substances being at least one of:

surface-reactive compounds serving as carriers of at least one of S, P, B and surface-reactive compounds serving as carriers of at least one refractory metal, and oil soluble metal carboxylates in combination with sulfurized additives;

said impact media being non-abrasive hard particles:

an article holder arrangement for said article arranged within said exposure tank; and an arrangement for creating a velocity difference between surfaces of said article and said impact media;

wherein said arrangement for creating a velocity difference comprises means for vibrating at least one of said process fluid and said article holder arrangement.

19. The device according to claim 15, wherein said arrangement for creating a velocity difference comprises means for directing an impact media flow against said surfaces of said article.

20. A device for inducing formation of solid lubricant on an article, comprising:

an exposure tank, having an inlet for a chemically reactive process fluid and impact media;

said chemically reactive process fluid comprising a solvent and additives of solid-lubricant precursor substances;

said solvent being a low-volatile high-flash solvent;

said additives of solid-lubricant precursor substances being at least one of:

surface-reactive compounds serving as carriers of at least one of S, P, B and surface-reactive compounds serving as carriers of at least one refractory metal, and oil soluble metal carboxylates in combination with sulfurized additives;

said impact media being non-abrasive hard particles;

an article holder arrangement for said article arranged within said exposure tank;

an arrangement for creating a velocity difference between surfaces of said article and said impact media;

a sedimentation arrangement and/or a decanting arrangement for process fluid being used in an inducing formation of solid lubricant; and a cyclone fluidly connected to an outlet from said sedimentation arrangement and/or a decanting arrangement.

* * * * *